(12) United States Patent
Tajima et al.

(10) Patent No.: US 9,049,028 B2
(45) Date of Patent: Jun. 2, 2015

(54) POWER SUPPLYING SYSTEM, MONITORING APPARATUS, MONITORING METHOD AND COMPUTER PROGRAM

(75) Inventors: Shigeru Tajima, Kanagawa (JP); Yoshifumi Nishida, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 740 days.

(21) Appl. No.: 12/258,975

(22) Filed: Oct. 27, 2008

(65) Prior Publication Data

US 2009/0210737 A1 Aug. 20, 2009

(30) Foreign Application Priority Data

Oct. 31, 2007 (JP) ................................. 2007-283380

(51) Int. Cl.
*G06F 1/26* (2006.01)
*G06F 11/32* (2006.01)
*H04L 12/10* (2006.01)
*H04L 12/40* (2006.01)

(52) U.S. Cl.
CPC .......... *H04L 12/10* (2013.01); *H04L 12/40045* (2013.01)

(58) Field of Classification Search
CPC ........................ H04L 12/10; H04L 12/40045
USPC ......................................................... 713/340
See application file for complete search history.

(56) References Cited

U.S. PATENT DOCUMENTS

| | | | | |
|---|---|---|---|---|
| 4,517,671 A | * | 5/1985 | Lewis ........................... 714/38.1 |
| 4,764,863 A | * | 8/1988 | Silverthorn et al. ............. 714/39 |
| 4,989,081 A | * | 1/1991 | Miyagawa et al. ............. 348/61 |
| 5,225,816 A | * | 7/1993 | Lebby et al. .................. 340/653 |
| 5,319,574 A | * | 6/1994 | Ikeda ............................ 711/100 |
| 5,437,040 A | * | 7/1995 | Campbell et al. ............. 713/340 |
| 5,644,707 A | * | 7/1997 | Chen ................................. 714/57 |
| 7,355,362 B2 | * | 4/2008 | Pai et al. ....................... 318/432 |
| 2002/0169868 A1 | * | 11/2002 | Lopke et al. .................. 709/224 |
| 2003/0031181 A1 | * | 2/2003 | Rowley et al. ................ 370/394 |
| 2003/0046522 A1 | * | 3/2003 | Ehmann et al. ................... 713/1 |
| 2004/0103194 A1 | * | 5/2004 | Islam et al. .................... 709/225 |
| 2006/0143583 A1 | * | 6/2006 | Diab et al. ........................ 716/4 |
| 2007/0005852 A1 | * | 1/2007 | Armstead et al. ............. 710/100 |
| 2007/0150616 A1 | * | 6/2007 | Baek et al. .................... 709/246 |
| 2007/0170909 A1 | * | 7/2007 | Vorenkamp et al. ........ 324/76.11 |
| 2008/0238712 A1 | * | 10/2008 | Thurmond et al. ...... 340/870.02 |

(Continued)

FOREIGN PATENT DOCUMENTS

JP 56-158557 A 12/1981
JP 04-068836 A 3/1992

(Continued)

OTHER PUBLICATIONS

Japanese Office Action issued in Japanese Patent Application No. 2011-024282, dated Sep. 10, 2013.

*Primary Examiner* — Nimesh G Patel
(74) *Attorney, Agent, or Firm* — Finnegan, Henderson, Farabow, Garrett & Dunner, L.L.P.

(57) ABSTRACT

A power supplying system is configured so that a power supply server for supplying power and a client for receiving power are connected through a bus line on which an information signal representing information and power exist superimposed on one another, and the information signal is exchanged between the power supply server and the client. To the bus line of the power supplying system, a monitoring apparatus to monitor at least one of the information signal and power information related to power is connected. The monitoring apparatus includes a receiving portion to detect an information signal existing on the bus line, and a display control portion to display at least one of the information signal and the power information exchanged between the power supply server and the client.

18 Claims, 16 Drawing Sheets

(56) References Cited

U.S. PATENT DOCUMENTS

| | | | |
|---|---|---|---|
| 2010/0052421 A1* | 3/2010 | Schindler et al. | 307/35 |
| 2010/0169410 A1* | 7/2010 | Lund et al. | 709/203 |

FOREIGN PATENT DOCUMENTS

| | | |
|---|---|---|
| JP | 09-261766 A | 10/1997 |
| JP | 09-297720 A | 11/1997 |
| JP | 2001-306191 | 11/2001 |
| JP | 2001-331884 A | 11/2001 |
| JP | 2002-511996 A | 4/2002 |
| JP | 2003-110589 A | 4/2003 |
| JP | 2006-053743 A | 2/2006 |
| JP | 2006-094013 A | 4/2006 |
| JP | 2006-262593 | 9/2006 |
| WO | WO 99/09712 A2 | 2/1999 |

* cited by examiner

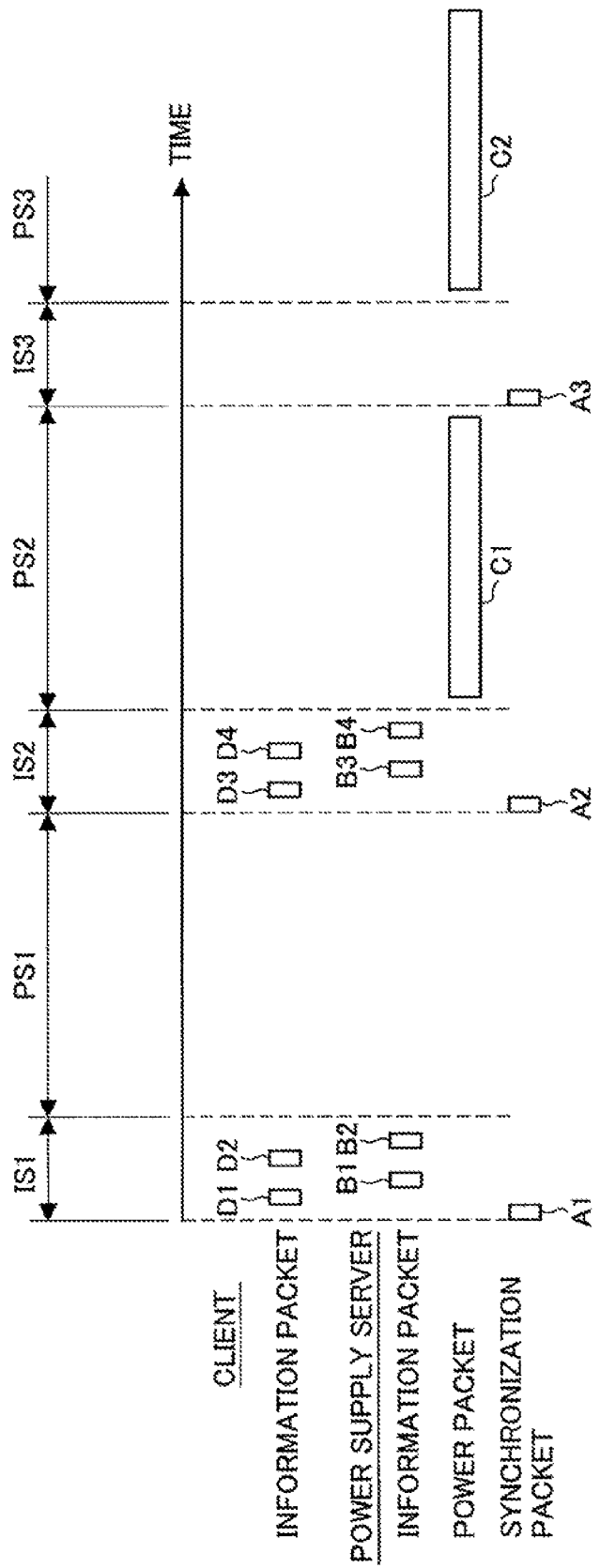

FIG.6

| POWER SUPPLY PACKET TYPE | VALUE | MNEMONIC |
| --- | --- | --- |
| SYNCHRONIZATION PACKET | 1 | Sync |
| SERVER REQUEST | 2 | ReqServer |
| SERVER REPLY | 3 | RepServer |
| TIME SYNCHRONIZATION | 4 | TimeSet |
| POWER SPECIFICATION NUMBER REQUEST | 32 | ReqSvrProfileNum |
| POWER SPECIFICATION NUMBER REPLY | 33 | RepSvrProfileNum |
| POWER SPECIFICATION REQUEST | 34 | ReqSvrProfile |
| POWER SPECIFICATION REPLY | 35 | RepSvrProfile |
| POWER SPECIICATION CONFIRMATION REQUEST | 36 | ReqSvrProfileSet |
| POWER SPECIFICATION CONFIRMATION REPLY | 37 | RepSvrProfileSet |
| NEW POWER SPECIFICATION REQUEST | 38 | ReqSvrProfileMake |
| NEW POWER SPECIFICATION REPLY | 39 | RepSvrProfileMake |
| PACKET NUMBER CONTROL REQUEST | 40 | ReqPacketNum |
| PACKET NUMBER CONTROL REPLY | 41 | RepPacketNum |
| TRANSMISSION START TIME SETTING REQUEST | 42 | ReqPowerSt |
| TRANSMISSION START TIME SETTING REPLY | 43 | RepPowerSt |
| POWER PACKET STOP REQUSET | 44 | ReqPowerSp |
| POWER PACKET STOP REPLY | 45 | RepPowerSp |
| SERVER PROFILE MODIFICATION REQUEST | 46 | ReqSvrProfileMod |
| SERVER PROFILE MODIFICATION REPLY | 47 | RepSvrProfileMod |
| NEGOTIATION CANCEL | 48 | Cansel |
| POWER PACKET NUMBER MODIFICATION REQUEST | 49 | ReqMorePacketNum |
| POWER PACKET NUMBER MODIFICATION REPLY | 50 | RepMorePacketNum |
| POWER PACKET | 129 | |

FIG.7

| TIME OF RECEIPT | SOURCE MAC ADDRESS | SOURCE IP ADDRESS | DESTINATION MAC ADDRESS | DESTINATION IP ADDRESS | POWER SUPPLY PACKET TYPE | PACKET CONTENT 1 | PACKET CONTENT 2 |
|---|---|---|---|---|---|---|---|
| 10:00. 012245 | 00:06:04:1A:2B:3D | - | FF:FF:FF:FF:FF:FF | - | 1 | - | |
| 10:00. 024312 | 00:03:44:22:4A:3F | - | FF:FF:FF:FF:FF:FF | - | 2 | - | |
| 10:00. 037654 | 00:06:04:1A:2B:3D | - | 00:03:44:22:4A:3F | - | 3 | - | |
| 10:00. 047221 | 00:03:44:22:4A:3F | - | 00:06:04:1A:2B:3D | - | 34 | 1 | |

| POWER PROILE | Profile1 | Profile2 |
|---|---|---|
| POWER TYPE (Power Type) | REGULATED FIXED DC VOLTAGE | REGULATED FIXED DC VOLTAGE |
| MAXIMUM VOLTAGE (Max Volt) | 55 | 125 |
| MINIMUM VOLTAGE (Min Volt) | 45 | 115 |
| NOMINAL VOLTAGE (Nom Volt) | 50 | 120 |
| MAXIMUM CURRENT (Max Curr) | 20 | 10 |
| AVERAGE CURRENT (Ave Curr) | 15 | 5 |

FIG.10

SERVER POWER PROFILE

| | Profile1 | Profile2 |
|---|---|---|
| POWER TYPE | REGULATED FIXED DC VOLTAGE | REGULATED FIXED DC VOLTAGE |
| MAXIMUM VOLTAGE | 55 | 125 |
| MINIMUM VOLTAGE | 45 | 115 |
| NOMINAL VOLTAGE | 50 | 120 |
| MAXIMUM CURRENT | 20 | 10 |
| AVERAGE CURRENT | 15 | 5 |

| POWER SUPPLY PACKET TYPE | VALUE | MNEMONIC |
|---|---|---|
| CLIENT REQUEST MESSAGE | 10 | ReqClientAdres |
| CLIENT REPLY MESSAGE | 11 | RepClientAdres |
| CLIENT POWER SPECIFICATION NUMBER REQUEST MESSAGE | 51 | ReqClientProfileNum |
| CLIENT POWER SPECIFICATION NUMBER REPLY MESSAGE | 52 | RepClientProfileNum |
| CLIENT POWER SPECIFICATION REQUEST MESSAGE | 53 | ReqClientProfile |
| CLIENT POWER SPECIFICATION REPLY MESSAGE | 54 | RepClientProfile |
| DEBUG MODE REQUEST MESSAGE | 55 | ReqSetServerDebugMode |
| DEBUG MODE REPLY MESSAGE | 56 | RepSetServerDebugMode |
| DEBUG MODE CANCEL REQUEST MESSAGE | 57 | ReqResetServerDebugMode |
| DEBUG MODE CANCEL REPLY MESSAGE | 58 | RepResetServerDebugMode |

171  172  173

POWER SUPPLYING SYSTEM, MONITORING APPARATUS, MONITORING METHOD AND COMPUTER PROGRAM

CROSS REFERENCES TO RELATED APPLICATIONS

The present invention contains subject matter related to Japanese Patent Application JP 2007-283380 filed in the Japan Patent Office on Oct. 31, 2007, the entire contents of which being incorporated herein by reference.

BACKGROUND OF THE INVENTION

1. Field of the Invention

The present invention relates to a power supplying system in which a power supply server to supply power and a client to receive power are connected through a bus line, a monitoring apparatus, a monitoring method and a computer program.

2. Description of the Related Art

There are used many battery-operated devices such as a personal computer. A large majority of battery-operated devices uses an AC adapter for battery charging and device operation. Although a direct current (DC) is usually used as input to a battery-operated device, because its voltage and current capacity is different, an AC adapter is basically dedicated to each device. Further, an AC adapter plug has no compatibility and cannot be used for another device in spite of having a similar structure. Accordingly, the number of AC adapters having the same function increases with an increase in the number of battery-operated devices.

To address such an issue, a power bus system in which a power supplying block which supplies power such as a battery and an AC adapter and a power consuming block which receives power from the power supplying block are connected to one common bus line has been proposed (e.g. Japanese Unexamined Patent Application Publication No. 2001-306191). In such a power bus system, each block describes itself as an object, and an object of each block exchanges status data or the like with each other through a bus line. An object of each block generates status data in response to a request from an object of another block and transmits it as reply data. An object of a block which receives reply data controls power supply and consumption based on the reply data.

SUMMARY OF THE INVENTION

In the development and design of the power bus system disclosed in Japanese Unexamined Patent Application Publication No. 2001-306191, it is necessary to monitor the operation state of each device which is connected to the system. However, there is no means of monitoring the operation state. In such a power supplying system, monitoring may be requested where necessary during actual operation.

Further, if an information signal which represents information and power which serves as energy are superimposed on one another and exist as packets on a bus line, accurate information cannot be obtained when monitoring either one of signal information or power.

In light of the foregoing, it is desirable to provide a novel and improved power supplying system which includes a monitoring apparatus capable of monitoring the operation state of the power supplying system.

According to an embodiment of the present invention, there is provided a power supplying system where a power supply server for supplying power and a client for receiving power are connected through a bus line on which an information signal representing information and power exist superimposed on one another, and the information signal is exchanged between the power supply server and the client. To the bus line of the power supplying system, a monitoring apparatus to monitor at least one of the information signal and power information related to power is connected. The monitoring apparatus includes a receiving portion to detect an information signal existing on the bus line, and a display control portion to display at least one of the information signal and the power information exchanged between the power supply server and the client.

In this embodiment, the monitoring apparatus which is connected to the bus line detects the information signal for grasping the state of the power supply server and the client in the power supplying system and performs processing for displaying the detected information signal or the like as user-recognizable information. A user can thereby grasp the state of the power supply server and the client in the power supplying system.

The monitoring apparatus may further include an information processing portion to generate an information signal to be transmitted to the power supply server or the client, and a transmitting portion to transmit the information signal to the power supply server or the client. The monitoring apparatus can thereby exchange information with the power supply server or the client in addition to detecting the information signal which exists on the bus line.

The monitoring apparatus may transmit an information signal for requesting a content to be displayed to the power supply server or the client, the power supply server or the client may transmit an information signal for displaying the requested content to the monitoring apparatus, and the monitoring apparatus may perform processing for displaying the information signal received from the power supply server or the client in the display control portion. The monitoring apparatus can thereby acquire desired information about the power supply server or the client. The content which is requested to the power supply server or the client by the monitoring apparatus may be a server power profile indicating a power specification of the power supply server or a client power profile indicating a specification of the client, for example.

Further, the monitoring apparatus may include an interface portion serving as the transmitting portion and the receiving portion so as to allow connection with the power supply server or the client without through the bus line. In this case, the power supply server and the client are configured to include a connecting portion to be connected with the interface portion of the monitoring apparatus. The monitoring apparatus can be thereby connected directly to the power supply server or the client without through the bus line.

In this case, the monitoring apparatus may transmit an information signal for stopping power supply to the client to the power supply server through the interface portion, so that the power supply server stops power supply to the client based on the received information signal. By transmitting the information signal for stopping power supply from the monitoring apparatus to the power supply server without through the bus line, it is possible to prevent an unintended change in the setting of the power supply server.

Furthermore, the monitoring apparatus may include an input portion to input an information signal to be transmitted to the power supply server or the client. A user can thereby acquire desired information easily.

The monitoring apparatus may be incorporated into the power supply server or the client. Alternatively, the monitoring apparatus may incorporate a function of the power supply server or the client. This diversifies the functions of the power supply server, the client and the monitoring apparatus.

According to another embodiment of the present invention, there is provided a monitoring apparatus connected to a bus line on which an information signal representing information and power exist superimposed on one another, to monitor at least one of the information signal and power information related to power exchanged between a power supply server for supplying power and a client for receiving power connected through the bus line. The monitoring apparatus includes a receiving portion to detect an information signal existing on the bus line, and a display control portion to display at least one of the information signal and the power information exchanged between the power supply server and the client.

According to another embodiment of the present invention, there is provided a monitoring method of monitoring at least one of an information signal and power information related to power exchanged between a power supply server for supplying power and a client for receiving power connected through a bus line on which an information signal representing information and power exist superimposed on one another. The monitoring method includes the steps of detecting an information signal existing on the bus line, and performing control to display at least one of the information signal and the power information exchanged between the power supply server and the client.

According to another embodiment of the present invention, there is provided a computer program causing a computer to function as the monitoring apparatus described above. The computer program is stored in a storage device of the computer, and it is read by a CPU of the computer and executed, thereby causing the computer to function as the monitoring apparatus. There is also provided a computer readable recording medium in which the computer program is stored. The recording medium may be a magnetic disk, an optical disk and so on, for example.

According to the embodiments of the present invention described above, it is possible to provide a power supplying system which includes a monitoring apparatus capable of monitoring the operation state of the power supplying system.

BRIEF DESCRIPTION OF THE DRAWINGS

FIG. 5 is an explanatory view showing an example of power supply processing performed between a power supply server and a client.

FIG. 6 is an explanatory view showing an example of an information signal transmitted and received among a power supply server, a client and a monitoring apparatus.

FIG. 7 is an explanatory view showing an example of display of an information packet in a display portion.

FIG. 9 is an explanatory view showing an example of the content of a server power profile.

FIG. 10 is an explanatory view showing an example of display of a server power profile displayed on a display portion.

FIG. 12 is an explanatory view showing an example of an information signal transmitted and received in client power profile display processing.

DETAILED DESCRIPTION OF THE PREFERRED EMBODIMENTS

Figure 1:
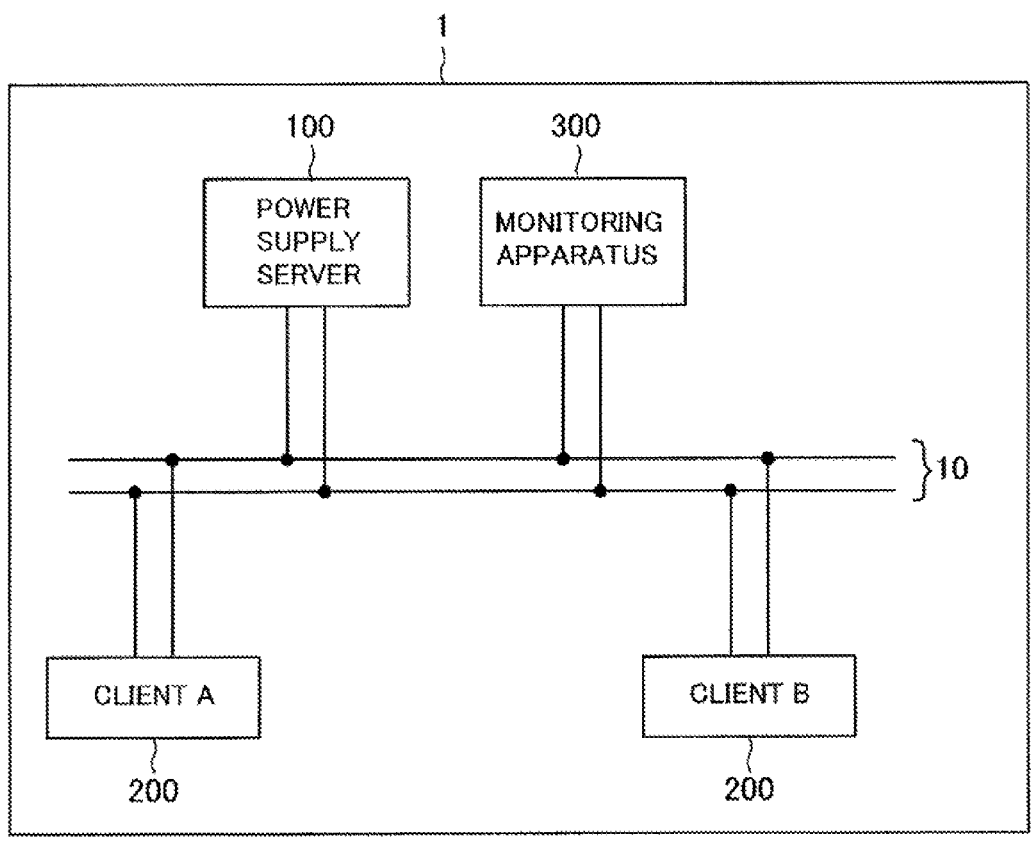
FIG. 1 is an explanatory view showing the schematic configuration of a power supplying system according to a first embodiment of the present invention.

Hereinafter, preferred embodiments of the present invention will be described in detail with reference to the appended drawings. Note that, in this specification and the appended drawings, structural elements that have substantially the same function and structure are denoted with the same reference numerals, and repeated explanation of these structural elements is omitted.

First Embodiment

Figure 2:
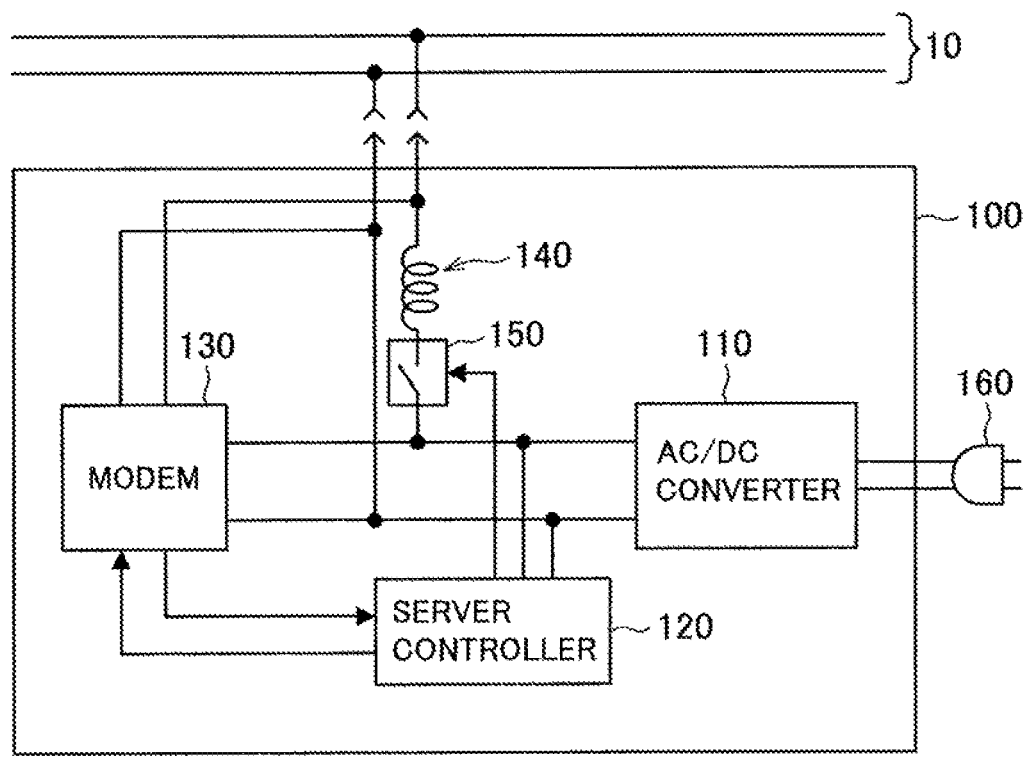
FIG. 2 is an explanatory view showing the configuration of a power supply server according to the embodiment.
Figure 3:
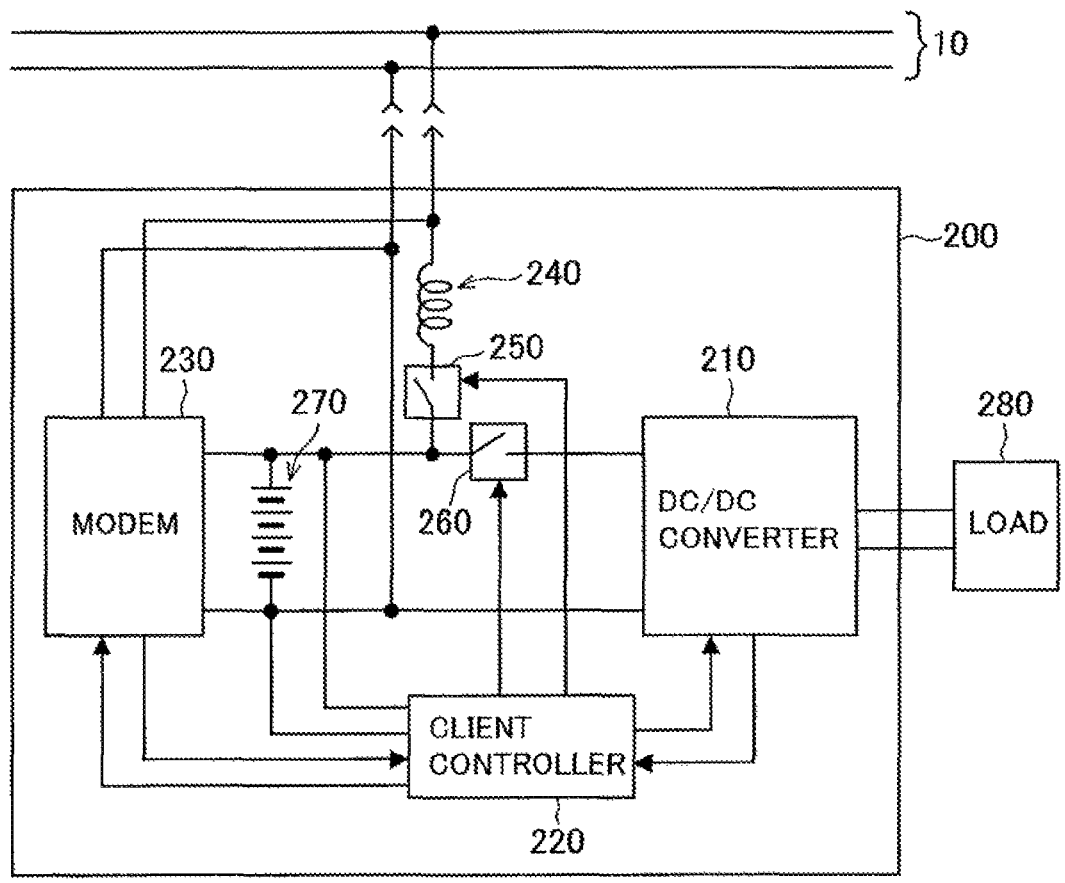
FIG. 3 is an explanatory view showing the configuration of a client according to the embodiment.
Figure 4:
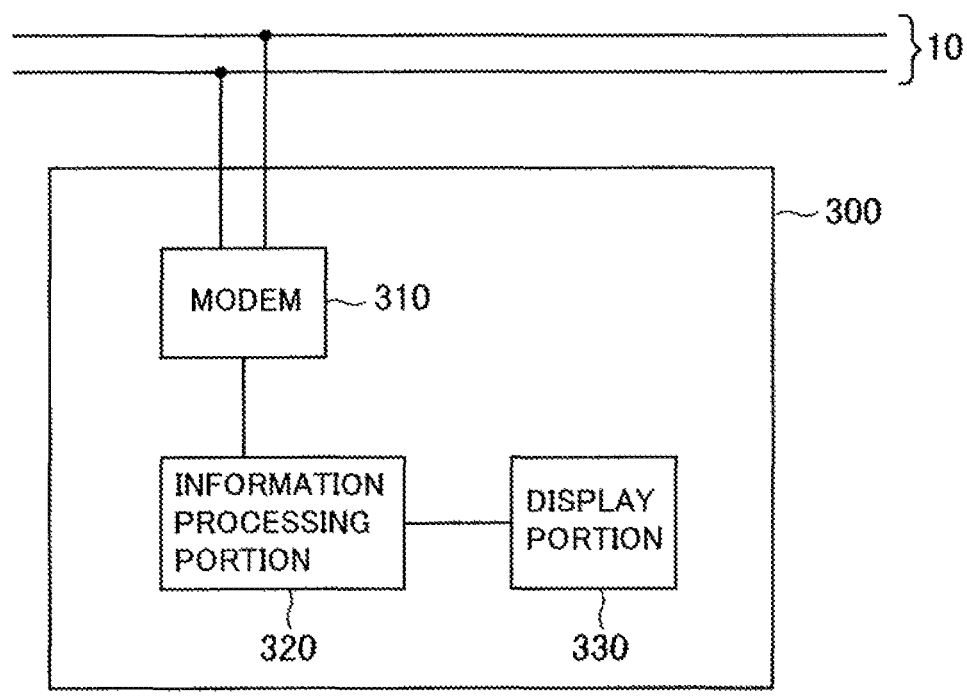
FIG. 4 is an explanatory view showing the configuration of a monitoring apparatus according to the embodiment.

The configuration of a power supplying system 1 according to a first embodiment of the present invention is described hereinafter with reference to FIGS. 1 to 4. FIG. 1 is an explanatory view showing the schematic configuration of the power supplying system 1 according to the embodiment. FIG. 2 is an explanatory view showing the configuration of a power supply server 100 according to the embodiment. FIG. 3 is an explanatory view showing the configuration of a client according to the embodiment. FIG. 4 is an explanatory view showing the configuration of a monitoring apparatus according to the embodiment.

<Configuration of Power Supplying System>

In the power supplying system 1 according to the embodiment, a power supply server 100, a client 200 and a monitoring apparatus 300 are connected to one bus line 10 as shown in FIG. 1. Although one power supply server 100, two clients 200 and one monitoring apparatus 300 are connected through the bus line 10 in this embodiment, one or two or more power supply servers 100, clients 200 and monitoring apparatus 300 may be connected to the bus line 10.

The power supply server 100 includes an AC/DC converter 110, a server controller 120 and a modem 130 as shown in FIG. 2.

The AC/DC converter 110 is an alternating current-direct current converting portion which processes commercial power 160 and converts it into a format that can be supplied to the client 200, which is described later. An inductor 140 and a switch 150 are placed between main supply power that is output from the AC/DC converter 110 and the bus line 10. The inductor 140 is placed to avoid reduction of the impedance of a communication path due to a bypass capacitor which is generally placed in an output portion of the AC/DC converter 110. The switch 150 is placed to avoid the abrupt output of power form the power supply server 100 to the bus line 10.

The server controller 120 is a control portion which implements each function for supplying power from the power supply server 100, and it is composed of a microprocessor and a peripheral circuit. For example, the server controller 120 performs control as to whether to connect a supply voltage from the AC/DC converter 110 to the bus line 10, communication protocol control in communication with the client 200, transmission/reception control of an information signal with the client 200 and so on. The server controller 120 includes a storage portion (not shown) which stores its power specification (server power profile), protocols for information signals, client information acquired by communication and so on as internal information.

The modem 130 is a device which connects an information signal to the bus line 10 so as to enable communication with the client 200 and the monitoring apparatus 300. Because an information signal and power share the same pair of lines, it is necessary to separate them by frequency division. Specifically, when an information signal is transmitted and received between the power supply server 100 and the client 200 through the bus line 10, the information signal is transmitted and received using a frequency band which is high enough to avoid interference with a frequency band used by power (e.g. a low frequency of about 400 Hz or below). The modem 130 performs modulation and demodulation in the communication portion.

The client 200 includes a DC/DC converter 210, a client controller 220 and a modem 230 as shown in FIG. 3.

The DC/DC converter 210 is a converting portion which converts power that is supplied from the power supply server 100 into a voltage or a current that is necessary for a load 280 to consume it. An inductor 240 and switches 250 and 260 are placed between the DC/DC converter 210 and the bus line 10, and they function in the same manner as the inductor 140 and the switch 150 of the power supply server 100.

The client controller 220 is a control portion which implements each function for receiving power in the client 200. For example, the client controller 220 determines how to consume power that is supplied from the power supply server 100 and performs protocol control. The client controller 220 includes a storage portion (not shown) which stores protocols for information signals, client information related to the specification of the client 200 (e.g. a client power profile, which is described later) and so on as internal information.

The modem 230 is a device which connects an information signal to the bus line 10 to enable communication with the power supply server 100 and the monitoring apparatus 300. The modem 230 also performs modulation and demodulation in the communication portion, just like the modem 130 of the power supply server 100.

The client 200 may further include a battery 270 which stores power that is supplied from the power supply server 100 when power consumption of the load 280 is zero or low.

The monitoring apparatus 300 includes a modem 310, an information processing portion 320 and a display portion 330 as shown in FIG. 4.

The modem 310 is a physical communication portion which fits the physical characteristics of information, and a power line communication modem (PLC modem) may be used in this embodiment where the modem is connected to the bus line 10 on which an information signal and power are superimposed. The modem 310 detects an information signal which is transmitted and received between the power supply server 100 and the client 200 that exist on the bus line 10.

The information processing portion 320 is a functional portion which performs processing for displaying an information signal on the bus line 10 that is acquired by the modem 310 on the display portion 330. The information processing portion 320 includes a storage portion (not shown) which stores a protocol for decoding an information signal. The information processing portion 320 analyzes an information signal, converts it into a format to be displayed on the display portion and transmits it to the display portion 330.

The display portion 330 displays the content of an information signal which exists on the bus line 10, and it may be a display or the like, for example.

In the power supplying system 1 having such a configuration, the power supply server 100 and the client 200 exchange an information signal for giving and receiving power, and the monitoring apparatus 300 detects the information signal and monitors interaction between the power supply server 100 and the client 200. The power supply processing which is performed between the power supply server 100 and the client 200 is described hereinafter with reference to FIG. 5, and the monitoring processing by the monitoring apparatus 300 is described after that. FIG. 5 is an explanatory view showing an example of the power supply processing which is performed between the power supply server 100 and the client 200.

<Power Supply Processing>

The power supply processing from the power supply server 100 to the client 200 in the power supplying system 1 according to the embodiment is performed based on synchronization packets which are output from the power supply server 100 to the bus line 10 at regular intervals. The client 200 recognizes the existence of the power supply server 100 from a synchronization packet on the bus line 10 and accesses the power supply server 100. In response to the access from the client 200, the power supply server 100 transmits its address to the client 200. Receiving the address of the power supply server 100, the client 200 transmits an information signal for requesting power supply to the power supply server 100 and thereby receives power from the power supply server 100. If a plurality of power supply servers 100 are connected to the bus line 10, a synchronization packet is output from any one power supply server 100.

Specifically, as shown in FIG. 5, the power supply server 100 outputs synchronization packets A1, A2, A3, . . . to the bus line 10 at regular time intervals. Further, the power supply server 100 outputs information packets B1, B2, B3, . . . , which are information signals that are transmitted to the client 200 to supply power, and power packets C1, C2, C3, . . . , which are power energy in a packet format. On the other hand, the client 200 outputs information packets D1, D2, D3, . . . , which are information signals that are transmitted to the power supply server 100 to receive power.

The power supply server 100 outputs a synchronization packet at the start of a time slot at a predetermined interval (e.g. at an interval of about 1 seconds). The time slot has an information slot during which an information packet is transmitted and a power slot during which a power packet is transmitted. Information slots IS1, IS2, IS3, . . . , are periods where an information packet to be transmitted and received between the power supply server 100 and the client 200 is output. Power slots PS1, PS2, PS3, . . . , are periods where a power packet to be supplied from the power supply server 100 to the client 200 is output. Because an information packet can be output only during the period of the information slot, if transmission/reception of an information packet is not completed in one information slot, the information packet is transmitted across a plurality of information slots. A power packet can be output only during the period of the power slot.

The power supply server 100 has one or two or more server power profile which indicates a power specification that can be supplied from the power supply server 100. The client 200 receives power from the power supply server 100 which is capable of supplying power that fits its own specification. The client 200 acquires a server power profile from the power supply server 100 and determines the specification (server power profile) of the power supply server 100 for the client 200 itself. Specifically, the client 200 first detects a synchronization packet A1 which is output from the power supply server 100 and acquires the address of the power supply server 100 which is included in the synchronization packet A1. The address may be a MAC address, for example. Next, the client 200 transmits to the power supply server 100 an information packet D1 that requests transmission of the number of server power profiles which the power supply server 100 has.

The contents of information packets which are transmitted and received between the power supply server 100 and the client 200 may be defined as shown in FIG. 6, for example. In this embodiment, a power supply packet type 171 which is the content of an information packet, a value 172 which is associated with the power supply packet type 171, and a mnemonic 173 which indicates a power supply packet type are defined by way of illustration. The client 200 transmits a mnemonic ReqSvrProfileNum which indicates a power specification number request as an information packet D1 to the power supply server 100.

Receiving the information packet D1, the power supply server 100 transmits a server power profile number that is the number of server power profiles which the power supply server 100 has, as an information packet B1. At this time, the power supply server 100 transmits a mnemonic RepSvrProfileNum which indicates a power specification number reply to the client 200. If the power supply server 100 has two server power profiles, for example, the power supply server 100 transmits a parameter "2" together with the mnemonic RepSvrProfileNum to the client 200.

Receiving the information packet B1, the client 200 acquires from the power supply server 100 the same number of the contents of server power profiles as the number of server power profiles of the power supply server 100. For example, if the power supply server 100 has two server power profiles, the client 200 firstly acquires a first server power profile. Specifically, the client 200 transmits a mnemonic ReqSvrProfile which indicates a power specification request as an information packet D2 to the power supply server 100. At this time, the client 200 transmits a parameter "1" together with the mnemonic ReqSvrProfile to the power supply server 100 in order to acquire the first server power profile.

Receiving the information packet D2, the power supply server 100 transmits the first server power profile which is stored in the storage portion of the server controller 120 as an information packet B2 to the client 200. At this time, the power supply server 100 transmits the content of the first server power profile as a parameter together with a mnemonic RepSvrProfile which indicates a power specification reply to the client 200.

Receiving the information packet B2 from the power supply server 100, the client 200 then transmits an information packet for acquiring a second server power profile. At this point, however, the information slot IS1 ends and the power slot PS1 for transmitting a power packet starts. Therefore, the information packet is transmitted in the next information slot IS2. In the power slot PS1, no power is supplied because a power specification which the client 200 receives from the power supply server 100 is not determined yet.

The power slot PS1 ends, and a synchronization packet A2 which indicates the start of the next time slot is output from the power supply server 100. After that, the client 200, which has received the information packet B2 from the power supply server 100, transmits a mnemonic ReqSvrProfile for acquiring a second server power profile as an information packet D3 to the power supply server 100. At this time, the client 200 transmits a parameter "2" together with the mnemonic ReqSvrProfile to the power supply server 100 in order to acquire the second server power profile.

Receiving the information packet D3, the power supply server 100 transmits the second server power profile which is stored in the storage portion of the server controller 120 as an information packet B3 to the client 200. At this time, the power supply server 100 transmits the content of the second server power profile as a parameter together with a mnemonic RepSvrProfile which indicates a power specification reply to the client 200.

Receiving the information packet B3, the client 200 has now acquired the two server power profiles of the power supply server 100, and it then selects a server power profile having the power specification which fits the client 200 itself. Then, the client 200 transmits an information packet for confirming the selected server power profile to the power supply server 100. For example, if the client 200 selects the power specification of the first server power profile, it transmits a mnemonic ReqSvrProfileSet which indicates a power specification confirmation request as an information packet D4 together with a parameter "1" which designates the first server power profile to the power supply server 100.

Receiving the information packet D4, the power supply server 100 transmits a mnemonic RepSvrProfileSet which indicates a power specification confirmation reply as an information packet B4 to the client 200 in order to notify the client 200 that the determination of the first server power profile is confirmed. After that, the information slot IS2 ends and the power slot PS2 starts, and the power supply server 100 outputs a power packet C1 to the client 200 so as to supply power thereto. As for the timing to transmit a power packet, a power supply start time may be designated by using a mnemonic ReqPowerSt which indicates a transmission start time setting request from the client 200 to the power supply server 100.

Power may be supplied from one power supply server 100 to a plurality of clients 200. In such a case, the power supply server 100 supplies power to the clients 200 one after the other, for example, because it is incapable of supplying power to them at the same time.

An example of the power supply processing which is performed between the power supply server 100 and the client 200 is described in the foregoing. In the power supplying system 1 where such exchange of an information packet and a power pocket is conducted through the bus line 10, the monitoring apparatus 300 detects an information packet or the like which exists on the bus line 10 and performs processing for displaying it on a display or the like. The monitoring apparatus 300 of this embodiment has a function of detecting an information packet which is exchanged between the power supply server 100 and the client 200 and displaying it, and it does not transmit any information signal to the power supply server 100 or the client 200. The display processing in the monitoring apparatus 300 according to the embodiment is described hereinafter.

<Display Processing in Monitoring Apparatus>

Firstly, the monitoring apparatus 300 according to the embodiment detects an information packet, which is an information signal, existing on the bus line 10 by the modem 310 that is connected to the modem 310. The detected information packet is transmitted to the information processing portion 320 and processed so as to be displayed on the display portion 330. Because unique mnemonics shown in FIG. 6 are used for information packets, the monitoring apparatus 300 stores a dedicated protocol for interpreting the content of an information packet and a general-purpose IP protocol stack as a base of the protocol in the storage portion. This is applied to the case where the power supplying system 1 is developed based on IP protocols. If the power supplying system 1 uses unique protocols, the monitoring apparatus 300 also stores such unique protocols.

The content of the information packet which is analyzed by the information processing portion 320 is transmitted to the display portion 330 and displayed on the display portion 330. FIG. 7 shows an example of display of information packets on the display portion 330. In FIG. 7, the content of power supply packets which are exchanged between the power supply server 100 and the client 200 is shown in time series. For example, displayed items may be a time of receipt 331, a source MAC address 332, a source IP address 333, a destination MAC address 334, a destination IP address 335, a power supply packet type 336 and packet contents 337 and 338 indicating parameters.

For example, the MAC address of the power supply server 100 is "00:06:04:1A:2B:3D", and the MAC address of the client 200 is "00:03:44:22:4A:3F". Referring to the display example of FIG. 7, at the time of receipt 10:00.012245, broadcast (the destination MAC address "FF:FF:FF:FF:FF:FF") of a synchronization packet (the power supply packet type "1") is performed by the power supply server 100 (the source MAC address "00:06:04:1A:2B:3D").

Next, at the time of receipt 10:00.024312, broadcast (the destination MAC address "FF:FF:FF:FF:FF:FF") of a server request (the power supply packet type "2") is performed by the client 200 (the source MAC address "00:03:44:22:4A:3F"). The server request is an information signal which is output from the client 200 when it is connected to the bus line 10 in order to detect the power supply server 100.

Then, at the time of receipt 10:00.037654, a server reply (the power supply packet type "3") is transmitted from the power supply server 100 (the source MAC address "00:06:04:1A:2B:3D") to the client 200 (the destination MAC address "00:03:44:22:4A:3F"). The server reply is an information signal which is output from the power supply server 100 as a response to the server request that is transmitted from the client 200. At this time, the client 200 can recognize the MAC address of the power supply server 100 from the source MAC address of the server reply.

After that, at the time of receipt 10:00.047221, a power specification request (the power supply packet type "34") is transmitted, together with a parameter (the packet content 1 "1"), from the client 200 (the source MAC address "00:03:44:22:4A:3F") to the power supply server 100 (the destination MAC address "00:06:04:1A:2B:3D"). In this manner, it is possible to display exchange of information signals between the power supply server 100 and the client 200 on the display portion 330 of the monitoring apparatus 300.

The configuration and the operation of the power supplying system 1 according to the first embodiment of the present invention are described in the foregoing. In the power supplying system 1 of this embodiment, it is possible to monitor the state of the power supplying system 1 by detecting an information signal on the bus line 10 and displaying it using the monitoring apparatus 300. A user can thereby grasp the operation of the power supply server 100 and the client 200 in the power supplying system 1.

Second Embodiment

Figure 8:
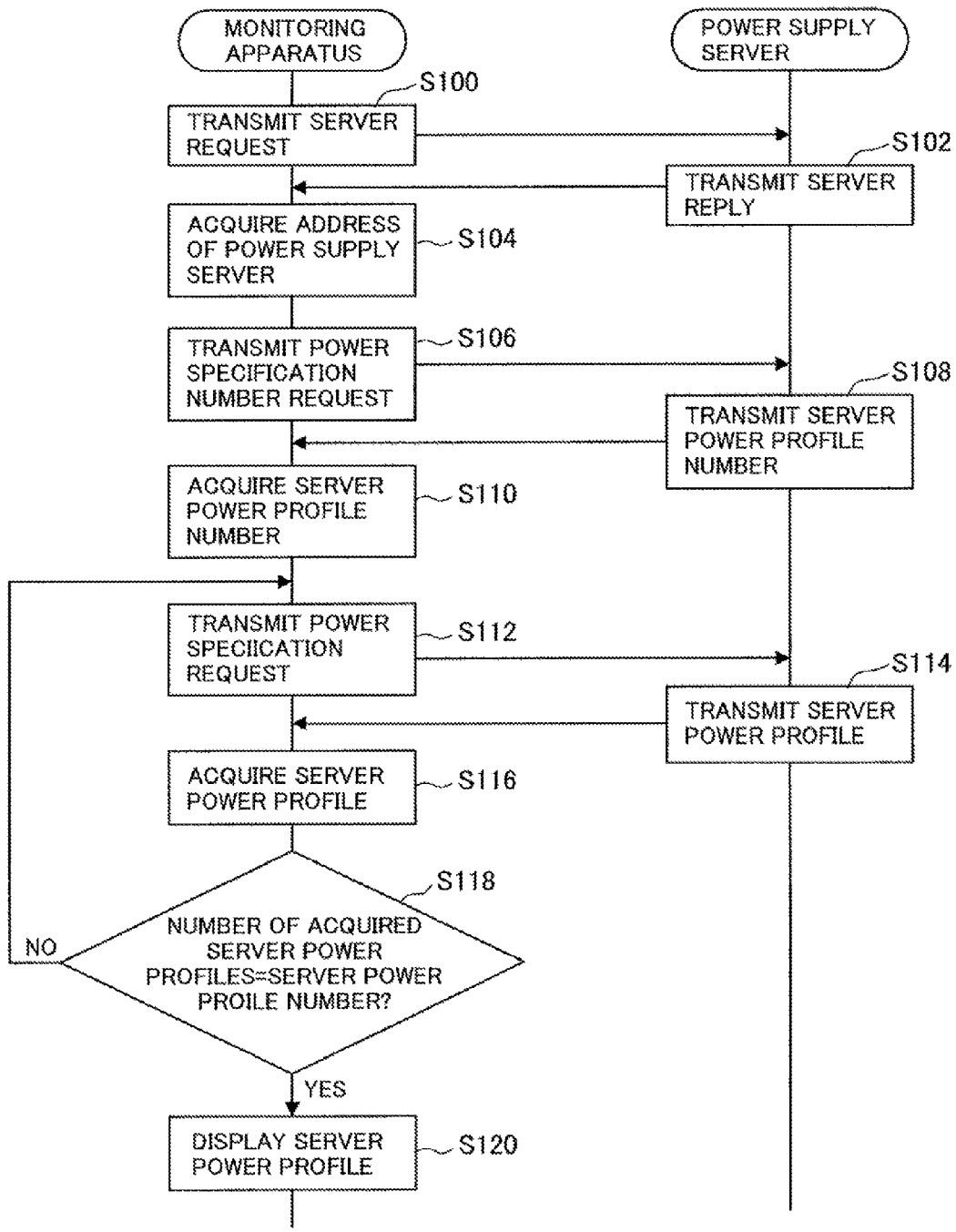
FIG. 8 is a flowchart showing an example of server power profile display processing performed between a power supply server and a monitoring apparatus according to a second embodiment of the present invention.

A power supplying system according to a second embodiment of the present invention is described hereinafter with reference to FIGS. 8 to 10. In the power supplying system of this embodiment, the power supply server 100, the client 200 and the monitoring apparatus 300 are connected through the bus line 10 as shown in FIG. 1, just like the first embodiment. However, the monitoring apparatus 300 of this embodiment is capable of exchanging an information signal with the power supply server 100 and the client 200, which is different from the first embodiment.

The display processing of an information signal by the monitoring apparatus 300, which is different from that of the first embodiment, is described hereinbelow. FIG. 8 is a flowchart showing an example of the server power profile display processing which is performed between the monitoring apparatus 300 and the power supply server 100 according to this embodiment. FIG. 9 is an explanatory view showing an example of the content of a server power profile. FIG. 10 is an explanatory view showing an example of display of a server power profile which is displayed on the display portion 330.
<Power Profile Display Processing in Monitoring Apparatus>

Processing for displaying a power profile of the power supply server 100 on the display portion 330 of the monitoring apparatus 300 is described hereinafter. Referring to FIG. 8, in the display processing in the monitoring apparatus 300 according to the embodiment, the monitoring apparatus 300 firstly outputs a mnemonic ReqServer which indicates a server request as an information packet to the bus line 10 in order to acquire the address of the power supply server 100 (S100). A broadcast address is designated as the destination MAC address of such an information packet.

Receiving the server request, the power supply server 100 outputs a mnemonic RepServer which indicates a server reply as an information packet to the bus line 10 (S102). The monitoring apparatus 300 detects the server reply which is output from the power supply server 100, thereby acquiring the MAC address of the power supply server 100 (S104).

Then, the monitoring apparatus 300 transmits a mnemonic ReqSvrProfileNum which indicates a power specification number request that requests notification of the number of server power profiles which the power supply server 100 has as an information packet to the power supply server 100 (S106). In the power supply server 100, one or two or more server power profiles are stored as information of the power supply system. A server power profile indicates a power specification which can be provided from the power supply server 100 to the client 200, and a power type 450, a maximum voltage 451, a minimum voltage 452, a nominal voltage 453, a maximum current 454 and an average current 455, for example, are stored as shown in FIG. 9. In the example of FIG. 9, the power supply server 100 has two server power profiles: Profile 1 and Profile 2.

Receiving the power specification number request from the monitoring apparatus 300, the power supply server 100 transmits the number of server power profiles of its own to the monitoring apparatus 300 (S108). Because the power supply server 100 has two server power profiles in this example, the power supply server 100 transmits a mnemonic RepSvrProfileNum and a parameter "2" to the monitoring apparatus 300. The monitoring apparatus 300 receives the information packet, thereby acquiring the number of server power profiles which the power supply server 100 has (S110).

Further, the monitoring apparatus 300 transmits a mnemonic ReqSvrProfile which indicates a power specification request to the power supply server 100 in order to acquire the server power profiles of the monitoring apparatus 300 (S112). Specifically, the monitoring apparatus 300 transmits a power specification request and a parameter "1" indicating the first profile in order to acquire the first server power profile. Receiving the power specification request, the power supply server 100 transmits the first server power profile together with a mnemonic RepSvrProfile to the monitoring apparatus 300 (S114). Then, the monitoring apparatus 300 receives the server power profile which is transmitted from the power supply server 100 (S116).

After that, the monitoring apparatus 300 determines whether the number of the server power profiles which have been acquired matches the number of the server power profiles which the power supply server 100 has (S118). This example describes processing for displaying all of the server power profiles which the power supply server 100 has on the monitoring apparatus 300. Accordingly, whether the monitoring apparatus 300 has acquired all of the server power profiles of the power supply server 100 is checked in this step.

If the number of the acquired server power profiles and the number of the server power profiles of the power supply server 100 do not match in the step S118, the process returns to the step S112 to acquire the second server power profile. On the other hand, if the number of the acquired server power profiles and the number of the server power profiles of the power supply server 100 match, it is determined that all of the server power profiles of the power supply server 100 have been acquired, and processing for displaying all of the acquired server power profiles on the display portion 330 is performed (S120).

In the step S120, data processing for converting the information packets which indicate the contents of the server power profiles which are acquired from the power supply server 100 into a display data format of the display portion 330 is performed. The contents of the data-processed server power profiles are shown on the display portion 330 as shown in FIG. 10, for example. Although the monitoring apparatus 300 of this embodiment includes the display portion 330 as shown in FIG. 4, the monitoring apparatus 300 may be connected to an external display device such as a display so as to display the contents of the server power profiles thereon. In such a case, data processing for converting the information packets which indicate the contents of server power profiles into a display data format corresponding to the external display device is performed in the step S120.

Processing for displaying the server power profiles of the power supply server 100 on the display portion 330 of the monitoring apparatus 300 is described in the foregoing. In this manner, the monitoring apparatus 300 can transmit an information signal for acquiring a server power profile to the power supply server 100 and acquire the server power profile. The acquired server power profile is processed by the information processing portion 320 so as to be displayed on the display portion 330 and then displayed on the display portion 330. A user can thereby grasp power supply information which can be provided from the power supply server 100 to the client 200.

<Client Power Profile Display Processing in Monitoring Apparatus>

Figure 11:
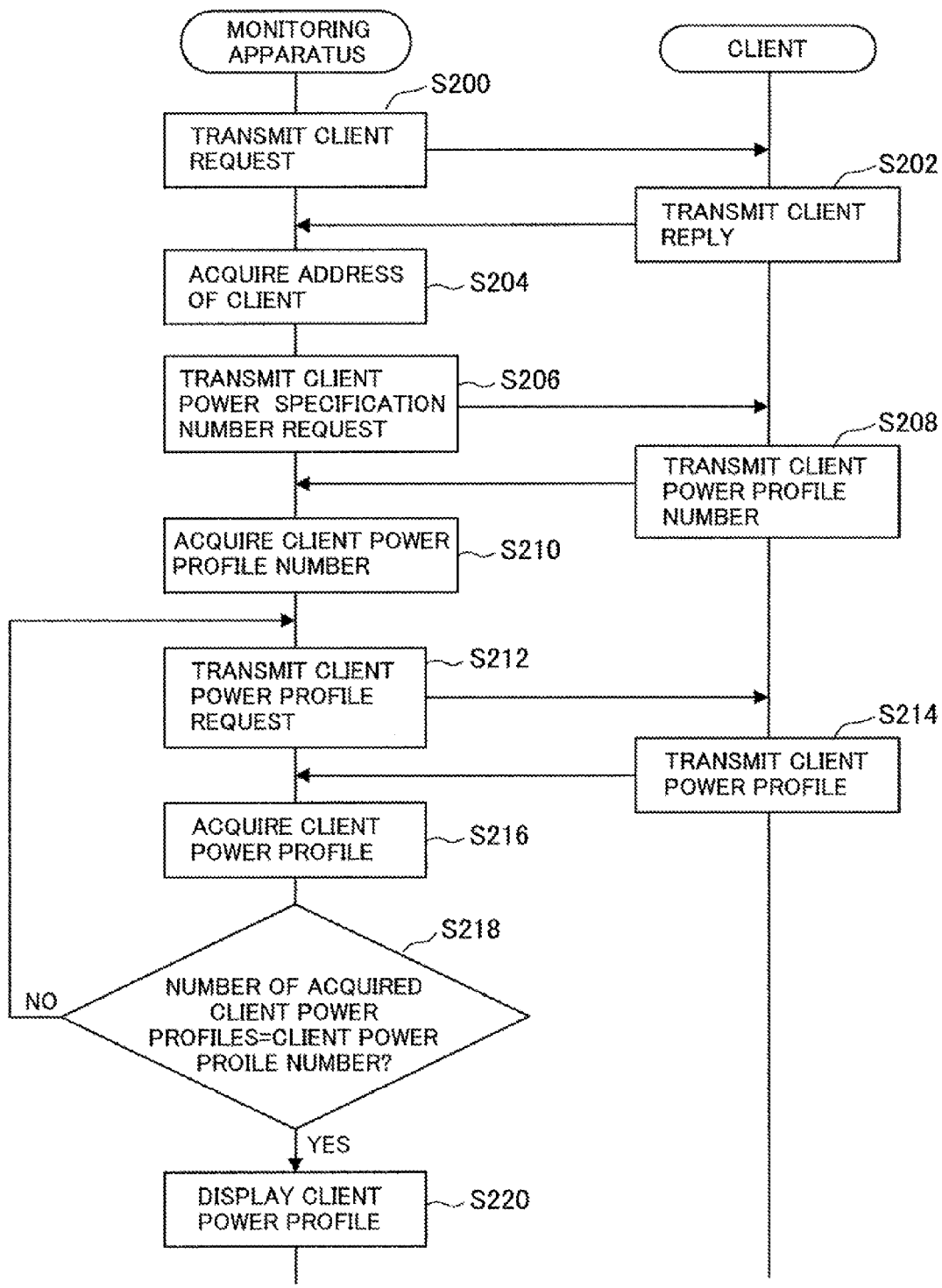
FIG. 11 is a flowchart showing an example of client power profile display processing performed between a client and a monitoring apparatus according to the embodiment.

On the other hand, the client 200 also has one or two or more client power profile which indicates a specification to be requested for the power supply server 100. Processing for displaying a power specification of the client 200 on the display portion 330 of the monitoring apparatus 300 is described hereinafter with reference to FIGS. 11 and 12. FIG. 11 is a flowchart showing an example of the client power profile display processing which is performed between the monitoring apparatus 300 and a client 200 according to the embodiment. FIG. 12 is an explanatory view showing an example of information signals which are exchanged in the client power profile display processing.

Referring to FIG. 11, in the display processing in the monitoring apparatus 300 of this embodiment, the monitoring apparatus 300 firstly outputs a mnemonic ReqClientAdres which indicates a client request to the bus line 10 in order to acquire the address of the client 200 (S200). A broadcast address is designated as the destination MAC address of such an information packet. All of the clients 200 which have received the client request output a mnemonic RepClientAdres which indicates a client reply as an information packet to the bus line 10 (S202). The monitoring apparatus 300 detects the client reply which is output from the client 200, thereby acquiring the MAC address of the client 200 (S204).

Then, the monitoring apparatus 300 transmits a mnemonic ReqClientProfileNum which indicates a client power profile number request as an information packet to the client 200 (S206). The client 200 has one or two or more client power profiles. In the step S206, the monitoring apparatus 300 transmits an information signal for acquiring the number of client power profiles. Receiving the client power profile number request from the monitoring apparatus 300, the client 200 transmits the number of client power profiles of its own to the monitoring apparatus 300 (S208). Specifically, the client 200 transmits a mnemonic RepClientProfileNum and the number of client power profiles as a parameter to the monitoring apparatus 300. The monitoring apparatus 300 receives the information packet, thereby acquiring the number of client power profiles which the client 200 has (S210).

Further, the monitoring apparatus 300 transmits a mnemonic ReqClientProfile which indicates a client power profile message to the client 200 in order to acquire the client power profiles of the client 200 (S212). Specifically, the monitoring apparatus 300 transmits a client power profile message and a parameter "1" indicating the first profile in order to acquire the first client power profile. Receiving the client power profile message, the client 200 transmits the first client power profile together with a mnemonic RepClientProfile to the monitoring apparatus 300 (S214). Then, the monitoring apparatus 300 receives the client power profile which is transmitted from the client 200 (S216).

After that, the monitoring apparatus 300 determines whether the number of the client power profiles which have been acquired matches the number of the client power profiles which the client 200 has (S218). This example describes processing for displaying all of the client power profiles which the client 200 has on the monitoring apparatus 300. Accordingly, whether the monitoring apparatus 300 has acquired all of the server power profiles of the client 200 is checked in this step.

If the number of the acquired client power profiles and the number of the client power profiles of the client 200 do not match in the step S218, the process returns to the step S212 to acquire the second client power profile. On the other hand, if the number of the acquired client power profiles and the number of the client power profiles of the client 200 match, it is determined that all of the client power profiles of the client 200 have been acquired, and processing for displaying all of the acquired client power profiles on the display portion 330 is performed (S220).

Processing for displaying the client power profile of the client 200 on the display portion 330 of the monitoring apparatus 300 is described in the foregoing. In this manner, the monitoring apparatus 300 can transmit an information signal for acquiring a client power profile to the client 200 and acquire the client power profile. The acquired client power profile is processed by the information processing portion 320 so as to be displayed on the display portion 330 and then displayed on the display portion 330. A user can thereby grasp a power specification to be requested by the client 200 for the power supply server 100.

The monitoring apparatus 300 of this embodiment may include an input portion (not shown) for inputting the content of an information signal to be transmitted to the power supply server 100 and the client 200. A user can thereby input the content of an information signal for acquiring information about the power supply server 100 or the client 200 to be displayed on the display portion 330 of the monitoring apparatus 300 using the input portion, so that desired information is displayed on the display portion 330.

Third Embodiment

Figure 13:
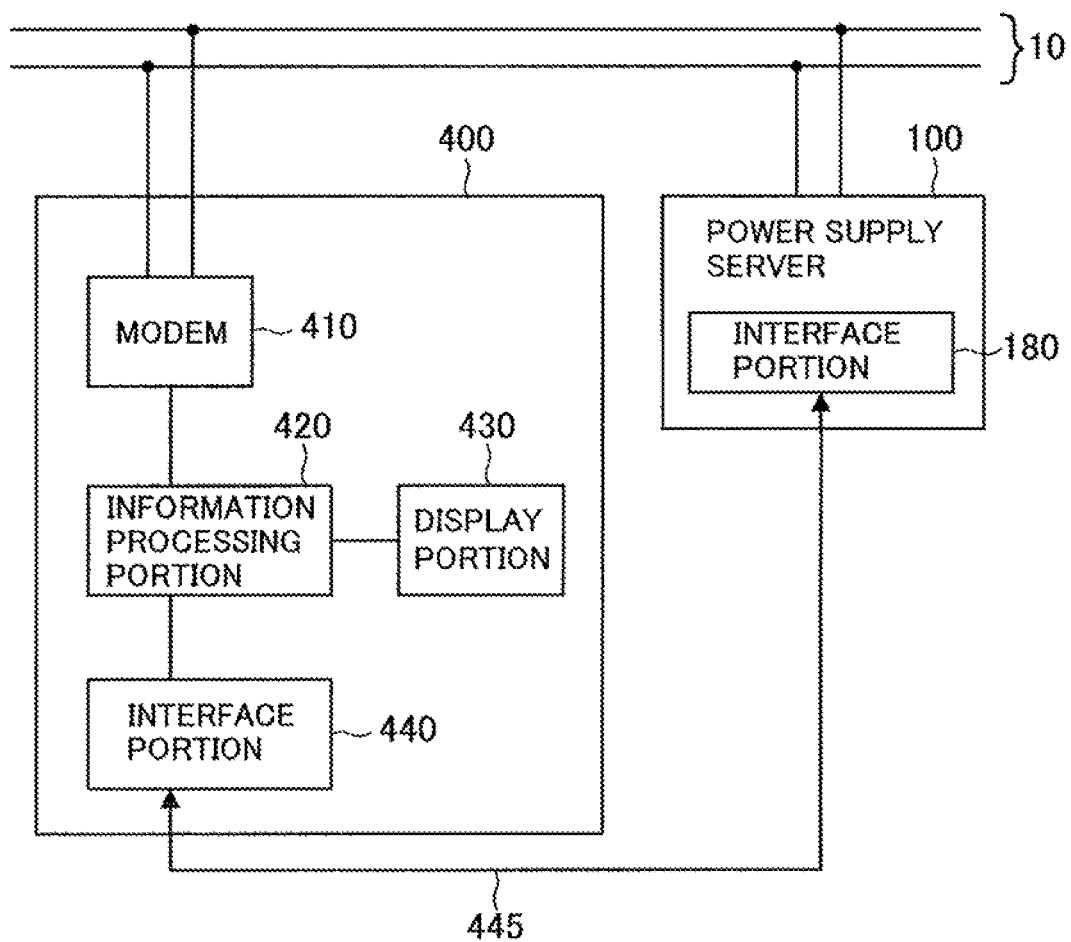
FIG. 13 is an explanatory view showing the configuration of a monitoring apparatus according to a third embodiment of the present invention.

A power supplying system according to a third embodiment of the present invention is described hereinafter with reference to FIG. 13. FIG. 13 is an explanatory view showing the configuration of a monitoring apparatus 400 according to the embodiment. In the power supplying system according the embodiment, the power supply server 100, the client 200 and the monitoring apparatus 400 are connected through the bus line 10 as shown in FIG. 1, just like the first embodiment. The power supply server 100, the client 200 and the monitoring apparatus 400 according to this embodiment have an interface portion which can be connected without through the bus line 10. The power supplying system according to the embodiment is described hereinafter, mainly about a difference from the first embodiment. The same configuration and function as those of the first embodiment are not described in detail herein.

<Configuration of Power Supplying System>

The configuration of the monitoring apparatus 400 according to the embodiment is described hereinafter with reference to FIG. 13. The monitoring apparatus 400 of this embodiment includes a modem 410 which is a physical communication portion that fits the physical characteristics of information, an information processing portion 420 which performs processing for displaying an information signal that is acquired by the modem 410 on a display portion 430, the display portion 430 which displays the content of an information signal or the like, and an interface portion 440. The modem 410, the information processing portion 420 and the display portion 430 may be configured in the same way as the equivalents in the first embodiment.

The interface portion 440 is a connecting portion which enables communication with the power supply server 100 or the client 200 without through the bus line 10. In order to connect the monitoring apparatus 400 to the power supply server 100 or the client 200 without through the bus line 10, it is necessary for the power supply server 100 or the client 200 to include an interface portion 180 which is connectable to a connection line 445.

The interface portion 440 transmits an information signal which is output from the information processing portion 420 to the power supply server 100 or the client 200 through the connection line 445. The interface portion 440 also receives an information signal which is transmitted from the power supply server 100 or the client 200 through the connection line 445 and outputs it to the information processing portion 420. The connection line is different from the bus line 10, and Ethernet (registered trademark), USB, RS232C or the like may be used.

<Debug Mode Setting Processing>

In the case of testing a newly produced client 200, for example, there is a possibility that the power supply server 100 outputs power beyond an allowable range of the client 200 for some reason to cause a breakdown of the client 200. In order to avoid this, it is possible to set a debug mode in the power supplying system according to this embodiment. In this embodiment, the debug mode refers to the state of the power supply server 100 that performs exchange of an information packet according to normal protocol processing but does not perform exchange of a power packet.

Figure 14:
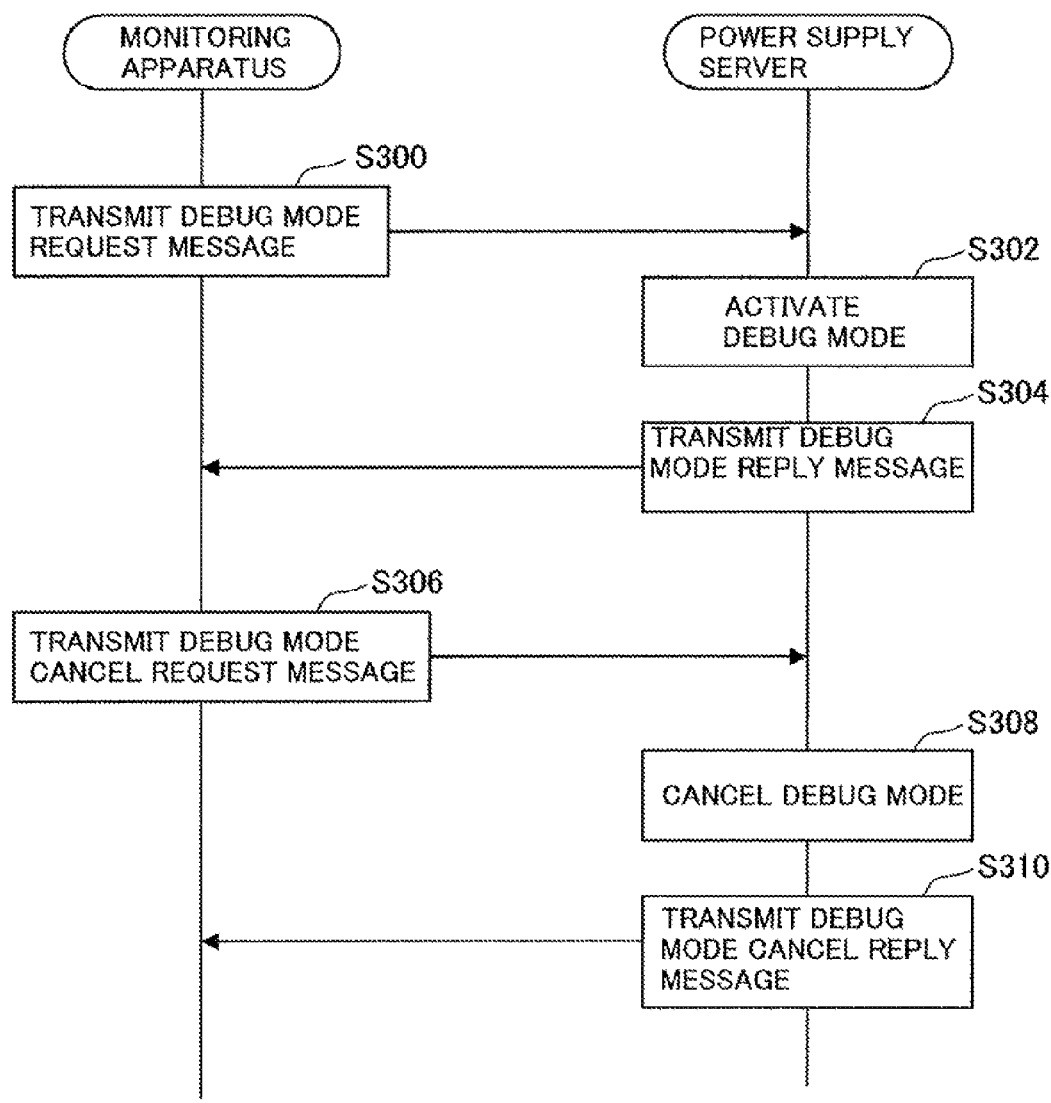
FIG. 14 is a flowchart showing debug mode setting processing.

Particularly, it is possible to avoid a change in the setting of the power supply server 100 by performing setting/canceling of a debug mode through the connection line 445 which is different from the bus line 10 with the use of the power supply server 100, the client 200 and the monitoring apparatus 400 having the configuration according to this embodiment. The debug mode setting processing in the power supplying system according to the embodiment is described hereinafter with reference to FIG. 14. FIG. 14 is a flowchart showing the debug mode setting processing.

Referring to FIG. 14, in the debug mode setting processing in the power supplying system according to the embodiment, the monitoring apparatus 400 firstly transmits a mnemonic ReqSetServerDebugMode which indicates a debug mode request message for setting a debug mode as an information packet to the power supply server 100 (S300). At this time, the information packet is transmitted from the interface portion 440 of the monitoring apparatus 400 to the interface portion 180 of the power supply server 100 through the connection line 445.

Receiving the debug mode request message, the power supply server 100 activates the debug mode (S302). Then, the power supply server transmits a mnemonic RepSetServerDebugMode which indicates a debug mode reply message as an information packet to the monitoring apparatus 400 (S304). The power supply server 100 thereby operates in the debug mode until it receives a debug mode cancel request. Instead of not transmitting a power packet, a dummy packet may be transmitted to the power supply server 100 which is operating in the debug mode.

After that, when canceling the debug mode, the monitoring apparatus 400 transmits a mnemonic ReqResetServerDebugMode which indicates a debug mode cancel request message as an information packet to the power supply server 100 (S306). Receiving the debug mode cancel request message, the power supply server 100 cancels the debug mode (S308). Then, the power supply server 100 transmits a mnemonic RepResetServerDebugMode which indicates a debug mode cancel reply message as an information packet to the monitoring apparatus 400 (S310).

In this manner, it is possible to exchange an information signal for performing the debug mode setting/canceling processing between the monitoring apparatus 400 and the power supply server 100. Although the debug mode setting processing may be performed through the bus line 10, it is possible to avoid an unintended change in the setting of the power supply server 100 by exchanging an information signal related to the debug mode setting processing through the connection line 445 rather than through the bus line 10.

Further, in the power supplying system having the configuration of this embodiment shown in FIG. 13, the server power profile display processing which is performed between the monitoring apparatus and the power supply server, the client power profile display processing which is performed between the monitoring apparatus and the client and so on described in the second embodiment may be performed through the connection line 445, not through the but line 10. In other words, any information signal may be exchanged through the connection line 445.

Fourth Embodiment

Figure 15:
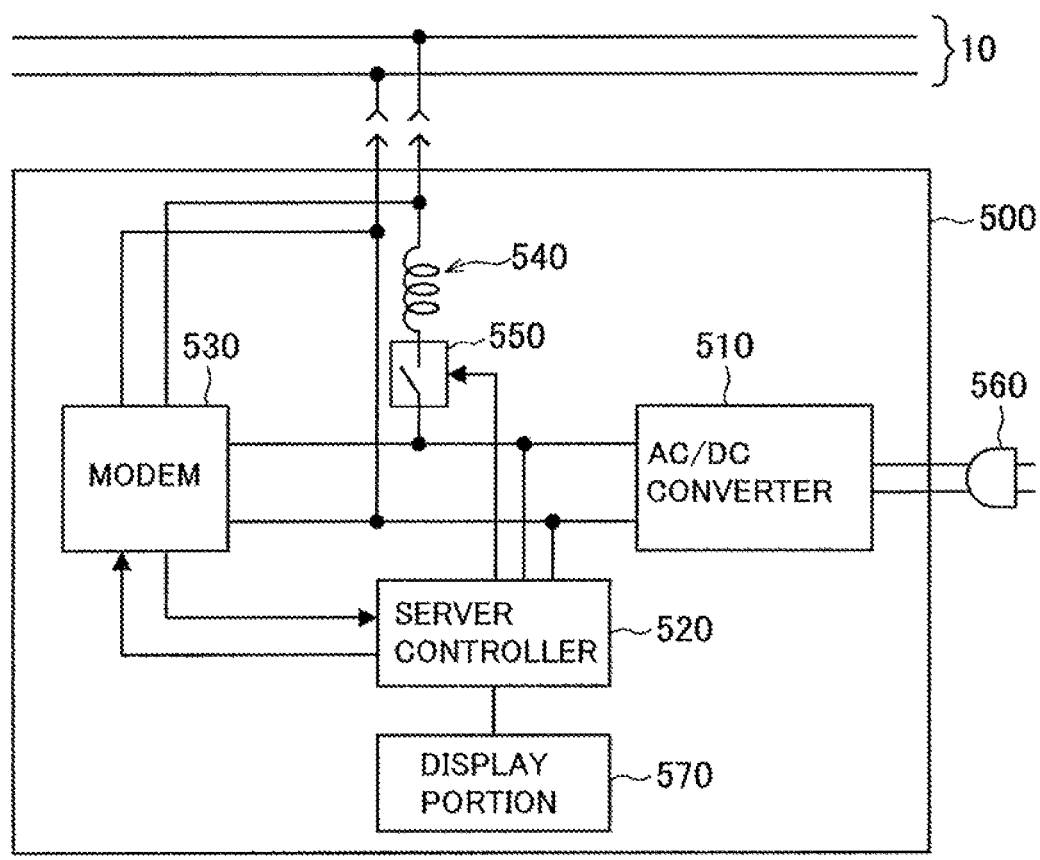
FIG. 15 is an explanatory view showing the configuration of a monitoring apparatus according to a fourth embodiment of the present invention.

A power supplying system according to a fourth embodiment of the present invention is described hereinafter with reference to FIG. 15. FIG. 15 is an explanatory view showing the configuration of a monitoring apparatus 500 according to this embodiment. The monitoring apparatus of the power supplying system according to the embodiment has a function of a power supply server or a client in addition to a monitoring function. The configuration and the operation of the monitoring apparatus 500 which has a function of a power supply server according to the embodiment are described hereinafter.

The monitoring apparatus 500 of this embodiment includes an AC/DC converter 510 which is an alternating current-direct current converting portion that processes commercial power 560 and converts it into a format which can be supplied to the client 200, a server controller 520 which is a control portion to implement each function for supplying power from the monitoring apparatus 500, a modem 530 which is a device for connecting an information signal to the bus line 10 and enabling communication with the client 200, and a display portion 570, as shown in FIG. 15. The AC/DC converter 510, the server controller 520 and the modem 530 may be those having the same configuration and function as in the first embodiment.

The display portion 570 displays the content of an information signal existing on the bus line 10, information held in the monitoring apparatus 500 itself and so on, and it may be connected to the server controller 520, for example. The display portion 570 may be a display or the like. Thus, the server controller 520 may incorporate a function of analyzing an information signal which exists on the bus line 10 and performing processing for displaying it on the display portion 570 in the monitoring apparatus 500. Alternatively, a display control portion (not shown) for displaying an information signal or the like on the display portion 570 may be placed, separately from the server controller 520.

The monitoring apparatus 500 of this embodiment functions as a power supply server with regard to reading and control of information of the client 200. Thus, it is the monitoring apparatus capable of supplying power to the client 200, which is substantially configured by incorporating a monitoring function into a power supply server. The monitoring apparatus 500 may detect an information signal which is transmitted and received between the power supply server 100 and the client 200 that are connected to the bus line 10 and display it on the display portion 570, just like the monitoring apparatus 300 as described in the first embodiment. The monitoring apparatus 500 may also transmit an information signal to the power supply server 100 or the client 200 as described in the second embodiment. Further, the monitoring apparatus 500 may include an interface portion (not shown) which enables connection with the power supply server 100 and the client 200 without through the bus line 10 as described in the third embodiment.

Although the monitoring apparatus 500 of this embodiment shown in FIG. 15 is capable of supplying power to the client 200, it may be configured not to supply power. Specifically, it may be configured so as to perform only exchange of an information signal with the client 200 through the bus line 10. In the event of transmitting a server power profile form the monitoring apparatus 500 to the client 200, a dummy power format in the server power profile may be used so as not to interfere with the communication with the client 200. At this time, no actual power exists on the bus line 10.

Further, the monitoring apparatus may be configured to have a function of a client as well. In this case also, there may be a monitoring apparatus which receives power and a monitoring apparatus which does not receive power. The monitoring apparatus which receives power is an apparatus in which a monitoring function is incorporated into a client. On the other hand, the monitoring apparatus which does not receive power ignores output of a power packet from the power supply server 100 and does not bring it in. By using a dummy power format described in a client power profile and clearly indicating that it is a terminal that does not receive power, it is possible to assert that the monitoring apparatus emulates a client that does not receive power.

The monitoring apparatus 500 of the power supplying system according to the fourth embodiment of the present invention is described in the foregoing. The monitoring apparatus 500 of this embodiment incorporates a function of a power supply server or a client in addition to a monitoring function. This diversifies the function of the monitoring apparatus. Further, the power supply server 100 or the client 200 may incorporate a monitoring function.

Fifth Embodiment

Figure 16:
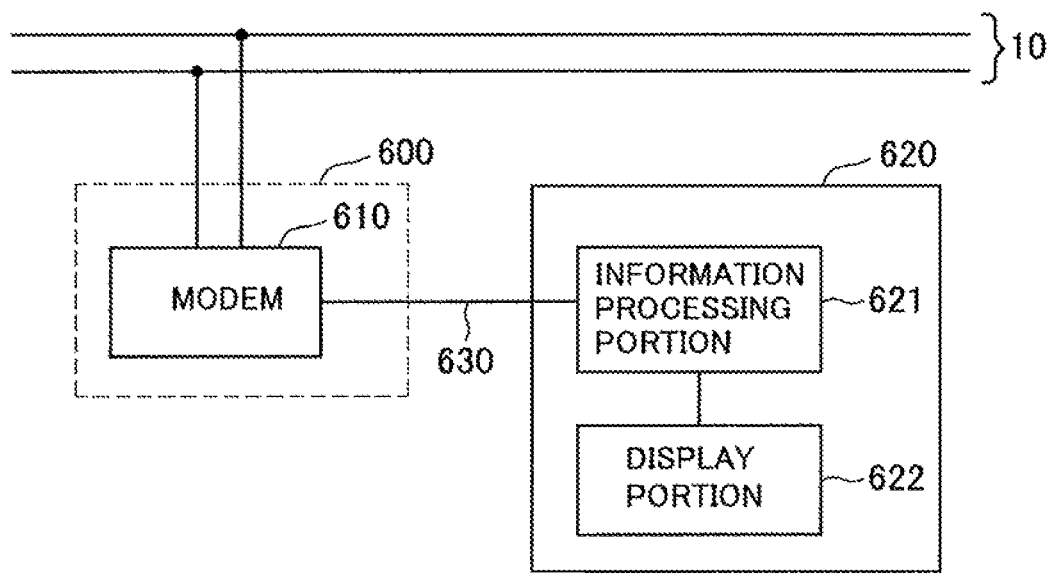
FIG. 16 is an explanatory view showing the configuration of a monitoring apparatus according to a fifth embodiment of the present invention.

A power supplying system according to a fifth embodiment of the present invention is described hereinafter with reference to FIG. 16. FIG. 16 is an explanatory view showing the configuration of a monitoring apparatus 600 according to this embodiment. The monitoring apparatus 600 of the power supplying system according to the embodiment includes only a modem as hardware, and an information processing portion for displaying an information signal on a display portion and the display portion are placed separately. The configuration and the operation of the monitoring apparatus 600 according to this embodiment are described hereinafter.

The monitoring apparatus 600 of this embodiment is composed of a modem 610 as shown in FIG. 16. Further, an information processing terminal 620 which includes an information processing portion 621 and a display portion 622, which is a functional portion for a user to monitor an information signal or the like, is connected to the modem 610.

The modem 610 is a physical communication portion that fits the physical characteristics of information, and it is connected to the bus line 10. The modem 610 may have the same configuration and function as the modem 310 of the first embodiment.

The information processing terminal 620 is a terminal for monitoring an information signal which is detected by the modem 610. The information processing portion 621 of the information processing terminal 620 analyzes the information signal and performs processing for displaying it on the display portion 622. The information processing portion 621 is connected to the modem 610 through a communication port 630. The display portion 622 displays the content of an information signal. A general-purpose personal computer or the like may be used as the information processing terminal 620. As the communication port 630, Ethernet (registered trademark), USB, RS232C or the like may be used.

The monitoring apparatus 600 of this embodiment is configured to provide main functions of a monitor to the information processing terminal 620 in the form of application software and cause the information processing terminal 620 to function as a part of the monitoring apparatus 600. In this manner, by providing main functions of a monitor in the form of software, it is possible to configure the monitoring apparatus 600 using an existing information processing terminal.

The monitoring apparatus 600 may detect an information signal which is exchanged between the power supply server 100 and the client 200 that are connected to the bus line 10 and display it on the display portion 622, just like the monitoring apparatus 300 as described in the first embodiment. The monitoring apparatus 600 may also transmit an information signal to the power supply server 100 or the client 200 as described in the second embodiment. Further, the information processing terminal 620, which functions as a part of the monitoring apparatus 600, may include an interface portion (not shown) which enables connection with the power supply server 100 and the client 200 without through the bus line 10 as described in the third embodiment.

It should be understood by those skilled in the art that various modifications, combinations, sub-combinations and alterations may occur depending on design requirements and other factors insofar as they are within the scope of the appended claims or the equivalents thereof.

For example, although time-series data of information signals exchanged between the power supply server and the client and power profiles of the power supply server and the client are illustrated as the contents to be displayed on the display portion, in the embodiments described above, the present invention is not limited thereto. For example, information before and after update of power profiles may be displayed in comparison with each other, and an operation status such a debug mode operation of the power supply server may be displayed. Further, if the power supply server supplies power to a plurality of clients, a power supply amount to each client, or a total power supply amount for each client may be displayed.

What is claimed is:

1. A power supplying system where a power supply server for supplying power, and a client for receiving power, are connected through a bus line on which an information signal representing information, and power exist superimposed on one another, the information signal being exchanged between the power supply server and the client, the system comprising:
    a monitoring apparatus connected to the bus line, to monitor at least one of the information signal and power information related to power packets transmitted from the power supply server to the client within a predetermined time slot;
    wherein the monitoring apparatus comprises:
        a receiving portion to detect the information signal existing on the bus line; and
        a display control portion to display:
            characteristics of the information signal, comprising at least a power supply packet type; and
            the power information exchanged between the power supply server and the client.

2. The power supplying system according to claim 1, wherein the monitoring apparatus further includes:
    an information processing portion to generate a request information signal to be transmitted to the power supply server or the client; and
    a transmitting portion to transmit the request information signal to the power supply server or the client.

3. The power supplying system according to claim 2, wherein the monitoring apparatus transmits the request information signal to the power supply server or the client, the request information signal requesting a content to be displayed,
the power supply server or the client transmits a content information signal for displaying the requested content to the monitoring apparatus, and
the monitoring apparatus performs processing for displaying the content information signal received from the power supply server or the client in the display control portion.

4. The power supplying system according to claim 3, wherein
the content requested to the power supply server or the client by the monitoring apparatus is a server power profile indicating a power specification of the power supply server or a client power profile indicating a specification of the client.

5. The power supplying system according to claim 2, wherein
the monitoring apparatus includes an interface portion serving as the transmitting portion and the receiving portion, to allow connection with the power supply server or the client through the bus line, and
the power supply server and the client include a connecting portion to be connected with the interface portion of the monitoring apparatus.

6. The power supplying system according to claim 5, wherein
the monitoring apparatus transmits a debug information signal for stopping power supply to the client to the power supply server through the interface portion, and
the power supply server stops power supply to the client based on the received debug information signal.

7. The power supplying system according to claim 2, wherein
the monitoring apparatus includes an input portion to input the request information signal to be transmitted to the power supply server or the client.

8. The power supplying system according to claim 1, wherein
the monitoring apparatus functions as the power supply server or the client.

9. The power supplying system according to claim 1, wherein
the characteristics include parameters of the information signal.

10. A monitoring apparatus connected to a bus line on which an information signal representing information, and power exist superimposed on one another, to monitor at least one of the information signal, and power information, the apparatus comprising:
    a receiving portion to detect the information signal and the power information existing on the bus line, wherein the power information is related to power packets sent from a power supply server for supplying power to a client, within predetermined time slot; and
    a display control portion to display:
        characteristics of the information signal, the characteristics comprising at least a power supply packet type; and
        the power information exchanged between the power supply server and the client.

11. The monitoring apparatus according to claim 10, wherein the monitoring apparatus further includes:

an information processing portion to generate a request information signal to be transmitted to the power supply server or the client; and a transmitting portion to transmit the request information signal to the power supply server or the client.

12. The monitoring apparatus according to claim 11, wherein the monitoring apparatus transmits the request information signal to the power supply server or the client, the request information signal requesting a content to be displayed, the power supply server or the client transmits a content information signal for displaying the requested content to the monitoring apparatus, and the monitoring apparatus performs processing for displaying the content information signal received from the power supply server or the client in the display control portion.

13. The monitoring apparatus according to claim 12, wherein the content requested to the power supply server or the client by the monitoring apparatus is a server power profile indicating a power specification of the power supply server or a client power profile indicating a specification of the client.

14. The monitoring apparatus according to claim 11, wherein the monitoring apparatus includes an interface portion serving as the transmitting portion and the receiving portion, to allow connection with the power supply server or the client through the bus line, and the power supply server and the client include a connecting portion to be connected with the interface portion of the monitoring apparatus.

15. The monitoring apparatus according to claim 14, wherein the monitoring apparatus transmits a debug information signal for stopping power supply to the client to the power supply server through the interface portion, and the power supply server stops power supply to the client based on the received debug information signal.

16. The monitoring apparatus according to claim 11, wherein the monitoring apparatus includes an input portion to input the request information signal to be transmitted to the power supply server or the client.

17. The monitoring apparatus according to claim 10, wherein the monitoring apparatus functions as the power supply server or the client.

18. A monitoring method of monitoring at least one of an information signal, and power information related to power, exchanged between a power supply server for supplying power and a client for receiving power, connected through a bus line on which the information signal representing information, and power, exist superimposed on one another, the method comprising the steps of:

detecting the information signal existing on the bus line, and the power information existing on the bus line, wherein the power information is related to power packets sent from a power supply server for supplying power to a client, within a predetermined time slot; and performing control to display:

characteristics of the information signal, the characteristics comprising at least a power supply packet type; and the power information exchanged between the power supply server and the client.

* * * * *